United States Patent [19]

Jeblick et al.

[11] 4,280,004

[45] Jul. 21, 1981

[54] MIXTURES OF AZODICARBONAMIDE AND α-AMIDOSULPHONES AND THEIR PRODUCTION AND USE AS A BLOWING AGENT

[75] Inventors: Werner Jeblick, Leverkusen; Ernst Roos, Odenthal; Theo Kempermann; Manfred Abele, both of Cologne, all of Fed. Rep. of Germany

[73] Assignee: Bayer Aktiengesellschaft, Fed. Rep. of Germany

[21] Appl. No.: 189,736

[22] Filed: Sep. 22, 1980

Related U.S. Application Data

[62] Division of Ser. No. 132,861, Mar. 24, 1980.

[30] Foreign Application Priority Data

Mar. 28, 1979 [DE] Fed. Rep. of Germany ....... 2912290

[51] Int. Cl.³ .............................................. C08J 9/10
[52] U.S. Cl. .................................... 521/89; 252/350; 264/DIG. 5; 521/94; 521/95; 521/148; 521/910
[58] Field of Search ...................... 521/94, 95, 89, 148, 521/910; 264/DIG. 5; 252/350

[56] References Cited

U.S. PATENT DOCUMENTS

| | | | |
|---|---|---|---|
| 2,804,435 | 8/1957 | Reed | 260/724 |
| 3,278,466 | 10/1966 | Crom et al. | 521/95 |
| 3,321,413 | 5/1967 | Riley et al. | 521/73 |
| 4,096,100 | 6/1978 | Hunter et al. | 521/89 |

FOREIGN PATENT DOCUMENTS

| | | | |
|---|---|---|---|
| 45-19381 | 7/1970 | Japan | 260/724 |
| 392073 | 1/1974 | U.S.S.R. | 521/89 |

OTHER PUBLICATIONS

Meijer et al., Rec. Trav. Chime, vol. 92, pp. 72-82 (1973).
Roos et al., Chem. Abstracts, vol. 77, #141204w (1972).

*Primary Examiner*—Morton Foelak
*Attorney, Agent, or Firm*—Connolly and Hutz

[57] ABSTRACT

A mixture of azodicarbonamide and an α-amidosulphone corresponding to the general formula:

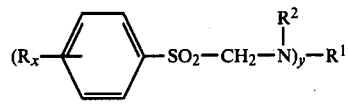

in which
R represents hydrogen, a $C_1$–$C_4$-alkyl residue and/or halogen,
x represents numbers from 0 to 5,
y represents numbers from 1 to 3, corresponding to the valency of $R_1$,
$R^1$ represents an aromatic carboxylic acid residue or sulphonic acid residue with 6 carbon atoms, which is optionally substituted once or several times by halogen, $C_1$–$C_4$ alkyl residues, $C_1$–$C_4$ alkoxy residues, nitro and/or cyano, or represents an aliphatic carboxylic acid residue or a sulphonic acid residue with 1-4 carbon atoms, a carbonic acid residue, a thiocarbonic acid residue or a phosphoric acid residue which, corresponding to the numerical value of y, contains 0-2 phenoxy residues or $C_1$–$C_4$ alkoxy residues optionally substituted with $C_1$–$C_4$ alkyl or halogen,
$R^2$ represents $R^1$, or hydrogen, a $C_1$–$C_4$ alkyl residue, a $C_5$–$C_7$ cycloalkyl residue, a phenyl residue, which is optionally substituted once or several times by $C_1$–$C_4$-alkyl or halogen, a phenyl alkyl residue whose phenyl group is optionally substituted once or several times by $C_1$–$C_4$-alkyl or halogen and whose alkyl group has 1-3 carbon atoms or $R_1$ and $R_2$ together with the nitrogen atom form a cyclic lactam ring which has 4-6 carbon atoms, can be used as a blowing agent for rubber.

3 Claims, No Drawings

MIXTURES OF AZODICARBONAMIDE AND α-AMIDOSULPHONES AND THEIR PRODUCTION AND USE AS A BLOWING AGENT

CROSS REFERENCE TO RELATED APPLICATIONS

This application is a division of application Ser. No. 132,861 filed Mar. 24, 1980.

This invention relates to a mixture of azodicarbonamide with α-amidosulphones, and its production through mixing the components together as well as its use as a blowing agent, particularly for the production of porous articles based on natural and/or synthetic rubbers.

The choice of a suitable chemical blowing agent for the production of cellular or porous articles based on rubber is first of all determined by the temperature at which the blowing agent decomposes with evolution of gas. Azodicarbonamide has a decomposition temperature from 200°–210° C; in mixtures the evolution of gas begins approximately at 160° C. Often, however, one wants to decompose the azodicarbonamide at lower temperatures. Decomposition at a lower temperature would being about a decrease in the thermal load of the mixtures which are to be foamed with azodicarbonamide. Furthermore, lower decomposition temperatures would produce higher decomposition rates and shorter processing cycles.

It is already known that the decomposition temperature of azodicarbonamide can be lowered by means of one or more so-called auxiliary blowing agents which have a lower decomposition temperature than azodicarbonamide (German Offenlegungsschrift No. 1,569,535).

As a result of using these auxiliary blowing agents it often happens that, with the production and processing of the mixtures containing the blowing agent, a premature decomposition of the blowing agent takes place since the auxiliary blowing agents, for example benzene sulphohydrazide, which are used as activators for azodicarbonamide, decompose at relatively low temperatures, e.g. at 80° C.

In storing mixtures which contain such combinations of blowing agents, premature and undesired decomposition of the auxiliary blowing agent can result, which is observed for example with rubber-mixtures through "premature blowing" and with synthetic materials, e.g. PVC-pastes, through so-called gassing. Furthermore, it is known that the decomposition temperature of azodicarbonamide can be lowered with so-called activators which are not themselves blowing agents. The activators can be divided up into two different classes: the class of compounds containing metal atoms and the class of compounds free from metal atoms.

The activators which contain metal atoms have various disadvantages. They are difficult to disperse in rubbers, they cause fading and are partly poisonous.

Activators which are free from metal atoms do not have these disadvantages. However, aromatic sulphinic acids as well as their ammonium salts according to German Offenlegungsschrift No. 2,102,177 have the disadvantage that they lack storing stability.

An object of the invention is to prepare a mixture based on azodicarbonamide which, when used as a blowing agent, does not have the above mentioned disadvantages.

The invention thus provides a mixture of azodicarbonamide and an α-amidosulphone of the general formula:

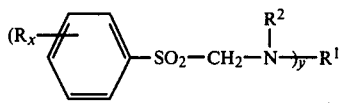

in which

R represents hydrogen, a $C_1$–$C_4$ alkyl residue and/or halogen, x represents numbers from 0–5, preferably 1, y represents numbers from 1–3, corresponding to the valency of $R_1$ $R^1$ represents an aromatic carboxylic acid residue or a sulphonic acid residue with six carbon atoms, which is optionally substituted once or several times by halogen, $C_1$–$C_4$ alkyl residues, $C_1$–$C_4$ alkoxy residues, nitro and/or cyano but is preferably unsubstituted, an aliphatic carboxylic acid residue or sulphonic acid residue with 1–4 carbon atoms, a carbonic acid residue or derivative thereof, a thiocarbonic acid residue or derivative thereof, or a phosphoric acid residue, which, corresponding to the numerical value of y contains 0–2 phenoxy residues or $C_1$–$C_4$ alkoxy residues optionally substituted by $C_1$–$C_4$ alkyl or halogen, $R^2$ has the same meaning as $R^1$, and may also represent hydrogen, a $C_1$–$C_4$ alkyl residue, a $C_5$–$C_7$ cycloalkyl residue, a phenyl residue, which is optionally substituted once or several times, preferably once by $C_1$–$C_4$ alkyl or halogen, a phenyl alkyl residue, whose phenyl group is optionally substituted once or several times, preferably once by $C_1$–$C_4$-alkyl or halogen, and whose alkyl group has 1–3, preferably 1 carbon atom, or $R^1$ and $R^2$ together with the nitrogen atom form a cyclic lactam ring, which has 4–6 carbon atoms.

The mixture preferably consists of 99.7 to 70% by weight, especially 99.5 to 85% by weight, of azodicarbonamide and 0.3 to 30% by weight, especially 0.5 to 15% by weight of the α-amidosulphone.

The invention also provides a process for the production of the mixture, the process being characterised in that azodicarbonamide and the α-amidosulphone are mixed together in the require quantitative ratio. The mixing temperature is from 10° to 50° C. The mixing is carried out in conventional apparatus.

The invention additionally relates to the use of the mixture according to the invention as a blowing agent.

In the general formula of the α-amidosulphone, the following meanings are preferred:

$C_1$–$C_4$ alkyl residue = methyl, ethyl, propyl or butyl, halogen = chlorine, bromine or iodine, $C_1$–$C_4$ alkoxy residue = methoxy, ethoxy, propoxy or butoxy, aromatic carboxylic acid residue = benzoic acid residue, aromatic sulphonic acid residue = benzenesulphonic acid residue, aliphatic carboxylic acid residue = formic acid residue, acetic acid residue or propionic acid residue aliphatic sulphonic acid residue = methane-, ethane or propane sulphonic acid residue, phosphoric acid residue = phosphoric acid ester residue with 0–2 ester groups having $C_1$ or $C_2$-alkyl groups or phenyl groups, carbonic acid residue=urea, or carbamic acid ester such as methyl ester or ethyl ester, thiocarbonic acid residue=thiourea, $C_5$-$C_7$ cycloalkyl residue=cyclopentyl residue, cyclohexyl residue or cycloheptyl residue, phenylalkyl residue=benzyl residue, phenyl ethyl residue or phenyl propyl residue, lactam ring with 4–6 carbon atoms=pyrrolidinone, piperidinone or ε-caprolactam The following are mentioned as examples of suitable compounds:

N,N'-dibenzenesylphonylmethyl-urea
N,N-dibenzenesulphonylmethyl-thiourea
N-benzenesulphonylmethyl-urea
N,N-dimethyl-N'-benzenesulphonylmethyl-urea
N-tosylmethyl-acetamide
N-benzenesulphonylmethyl-benzamide
N-tosylmethyl-benzamide
N-methyl-N-tosylmethyl-benzamide
N-benzenesulphonylmethyl-benzenesulphonamide
N-tosylmethyl-benzenesulphonamide
N-methyl-N-benzenesulphonyl-benzenesulphonamide
N,N'-dibenzenesulphonylmethyl-benzene-1,3-disulphonamide
N-tosylmethyl-ε-caprolactam
N-benzenesulphonylmethyl-ε-caprolactam
N-benzenesulphonylmethyl-carbamic acid ethyl ester
N,N',N''-tribenzenesulphonylmethyl-phosphoric acid trianilide The α-amidosulphones are known and are described for example in J. Strating et. al., Rec. Trav. Chim. 92 (1973) 72–82. The production takes place analogously to the following reaction scheme:

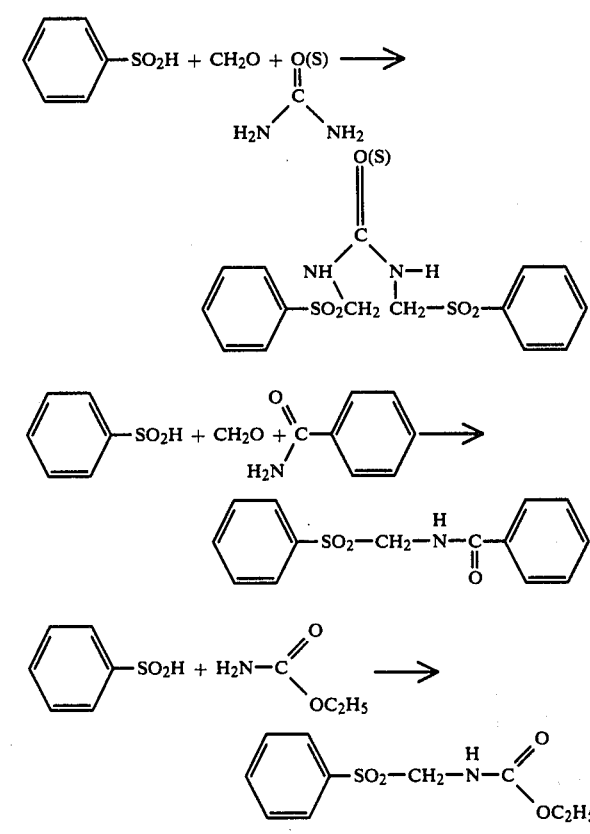

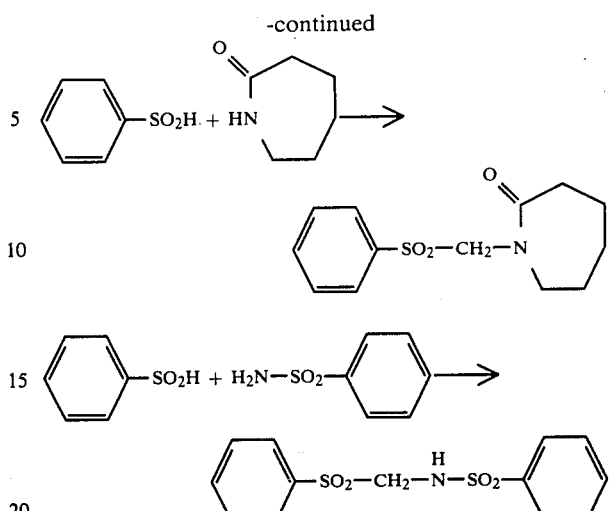

The mixture according to the invention can be added as a blowing agent in the quantities which are familiar to the expert to the substrate which is to be foamed. From 1 to 25 parts by weight, particularly 3 to 15 parts by weight, are preferably added per 100 parts by weight of polymer.

Suitable rubbers for the production of cellular or porous articles by using azodicarbonamide and activators based on α-amidosulphones are, for example, natural rubber or synthetic rubber-like polymers, which are obtained for example from conjugated diolefins, such as butadiene, chloroprene, dimethyl butadiene, isoprene and its homoloques; or mixed polymers such as those based on conjugated diolefins and polymerisable vinyl compounds, such as styrene, α-methyl styrene, acrylonitrile or methacrylonitrile, and furthermore polymers such as ethylenepropylene terpolymers, with dienes functioning as tercomponents, ethylene- propylene copolymers, as well as mixtures of the above-mentioned polymers.

The α-amidosulphones functioning as decomposition activators for azodicarbonamide can be incorporated in the mixtures which are to be foamed in the usual way, for example on a mixing roller apparatus, by kneaders or in mixers fitted with stirrers; they can be added simultaneously with other ingredients. The activators are, however, preferably added initially to the azodicarbonamide, which is used as the blowing agent.

The rubber mixtures can also contain other known auxiliary substances, for example active or inactive fillers, such as carbon black or chalk, antioxidants, antiozonants, waxes, dyes, pigments, zinc oxide, aliphatic acids such as, for example, stearic acid, mineral oils, softeners, lubricants, peroxides, vulcanizing agents such as sylphur and accelerators. The following are mentioned as examples of accelerators: thiozoles, guanidines, dithiocarbamates, thiurams and 2-mercaptoimidazoline.

After adding the mixture according to the invention optionally together with the other auxiliary substances, the plastics material is heated to a temperature of from 100° to 250° C., prefearably from 100° to 180° C. At this point the foaming process begins.

The foamed rubbers are suitable for the production of mould cured and continuously cured sponge rubber profiles (UHF- and LCM-processes), sponge rubber panels for sealing purposes and insulation purposes, materials for pipe insulation, expanded foam rubber panels for the production of soles of shoes and moulded bases.

The effect of the activators is shown in the following example, where the numerical values stated in Table 1 represent parts by weight.

TABLE I

|  | Mixture No. | | | | | |
| --- | --- | --- | --- | --- | --- | --- |
|  | 1 | 2 | 3 | 4 | 5 | 6 |
| Ethylene-propylene-diene terpolymer | 100.0 | 100.0 | 100.0 | 100.0 | 100.0 | 100.0 |
| Zinc oxide | 5.0 | 5.0 | 5.0 | 5.0 | 5.0 | 5.0 |
| Stearic acid | 1.0 | 1.0 | 1.0 | 1.0 | 1.0 | 1.0 |
| Furnace black (N 990) | 40.0 | 40.0 | 40.0 | 40.0 | 40.0 | 40.0 |
| Pulverised chalk | 75.0 | 75.0 | 75.0 | 75.0 | 75.0 | 75.0 |
| Napthenic mineral oil | 75.0 | 75.0 | 75.0 | 75.0 | 75.0 | 75.0 |
| 2-Mercaptobenzothiazole | 0.5 | 0.5 | 0.5 | 0.5 | 0.5 | 0.5 |
| Tetramethylthiuram-monosulphide | 1.5 | 1.5 | 1.5 | 1.5 | 1.5 | 1.5 |
| N,N'-Diphenylthiourea | 1.0 | 1.0 | 1.0 | 1.0 | 1.0 | 1.0 |
| Sulfur | 1.5 | 1.5 | 1.5 | 1.5 | 1.5 | 1.5 |
| Azodicarbonamide | 3.0 | 3.0 | 3.0 | 3.0 | 3.0 | 3.0 |
| N-benzenesulphonylmethyl-benzenesulphonamide | — | 0.3 | — | — | — | — |
| N,N'-dibenzenesulphonylmethyl-urea | — | — | 0.3 | — | — | — |
| N-benzenesulphonylmethyl-benzamide | — | — | — | 0.3 | — | — |
| N-benzenesulphonylmethyl-ε-caprolactam | — | — | — | — | 0.3 | — |
| N,N'-dibenzenesulphonylmethyl-thiourea | — | — | — | — | — | 0.3 |

The mixtures produced on a mixing roller apparatus were sprayed into profiles, each having the same cross section, by means of an extruder. These profiles were then placed into a suitable vulcanisation mould. The unvulcanised profiles were cut to the same length before being inserted, and they only partly filled the moulds, because only with complete gas evolution from the azodicarbonamide can the moulds be filled out during or after the vulcanisation. The vulcanisation was carried out in a press at 160° C. within a period of 20 minutes.

The vulcanized and blown sponge rubber profiles have the thicknesses (g/cm³) specified below:

| Mixture No: | 1 | 2 | 3 | 4 | 5 | 6 |
| --- | --- | --- | --- | --- | --- | --- |
| Density (g/cm³) | 0.73 | 0.44 | 0.42 | 0.47 | 0.49 | 0.44 |

It can be seen from this table that, without an activator, azodicarbonamide gives off an amount of gas which is too small, at a temperature of 160° C. and thereafter blows the mixture insufficiently. In this case a profile is obtained with a relatively high density (Mixture No. 1). All the other mixtures (Nos. 2-6), which contain activators in addition to azodicarbonamide, completely filled the given mould, as is apparent from the lower density.

We claim:

1. In the process of producing a foamed article from a rubber with the aid of a blowing agent, the improvement wherein said blowing agent is a mixture of azodicarbonamide and an α-amidosulphone of the formula

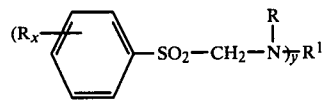

wherein each R is hydrogen, $C_1$-$C_4$ alkyl or halogen; x is from 0 to 5; y is from 1 to 3 and corresponds to the valency of $R^1$; $R^1$ is an aromatic carboxylic acid radical; a sulphonic acid radical having 6 carbon atoms; said sulphonic acid radical substituted at least once with halogen, $C_1$-$C_4$ alkyl, $C_1$-$C_4$ alkoxy, nitro or cyano; an aliphatic carboxylic acid radical having 1 to 4 carbon atoms; a sulphonic acid radical having 1 to 4 carbon atoms; a carbonic acid radical; a thiocarbonic acid radical or a phosphoric radical which, corresponding to the numerical value of y, contains 0-2 phenoxy radicals of $C_1$-$C_4$ alkoxy radicals or said phenoxy or alkoxy radical substituted with $C_1$-$C_4$ alkyl or halogen; $R^2$ is the same as $R^1$ or hydrogen; $C_1$-$C_4$ alkyl; $C_5$-$C_7$ cycloalkyl; phenyl; phenyl substituted at least once by $C_1$-$C_4$ alkyl or halogen; phenyl alkyl having 1 to 3 carbon atoms in the alkyl moiety; said phenyl alkyl substituted at least once by $C_1$-$C_4$ alkyl or $R^1$ or $R^2$ together with the nitrogen atom to which they are attached form a lactam ring which has 4 to 6 carbon atoms, said mixture containing 99.7-70% by weight of azodicarbonamide and 0.3-30% by weight of said α-amidosulfone.

2. The process of claim 1 wherein said mixture contains 99.5-85% by weight of azodicarbonamide and 0.5-15% by weight of said α-amidosulphone.

3. The process of claim 1 wherein 1 to 25 parts by weight of said mixture is added to each 100 parts by weight of rubber.

* * * * *